(12) United States Patent
Wu

(10) Patent No.: US 6,206,119 B1
(45) Date of Patent: Mar. 27, 2001

(54) ELECTRICAL WHEELCHAIR WITH DOUBLE FRAME STRUCTURE

(76) Inventor: Donald P. H. Wu, No. 169, Ken Tzu Ku, Shang Ken Tsun, Hsin Feng Hsiang, Hsinchu County (TW)

( * ) Notice: Subject to any disclaimer, the term of this patent is extended or adjusted under 35 U.S.C. 154(b) by 0 days.

(21) Appl. No.: 09/305,978

(22) Filed: May 5, 1999

(51) Int. Cl.[7] .............................. B60K 1/00; B62D 61/10; B60G 3/08
(52) U.S. Cl. ................... 180/65.1; 180/24.02; 180/907; 280/124.11
(58) Field of Search ................... 180/65.1, 907, 180/22, 24.02; 280/250.1, 124.11, 124.111

(56) References Cited

U.S. PATENT DOCUMENTS

| | | | |
|---|---|---|---|
| 1,259,064 | * | 3/1918 | Wolff ................................. 180/65.1 |
| 5,413,187 | * | 5/1995 | Kruse et al. ...................... 180/65.1 |
| 5,435,404 | * | 7/1995 | Garin, III .......................... 180/65.1 |
| 5,697,465 | * | 12/1997 | Kruse ................................ 180/65.1 |
| 5,904,214 | * | 5/1999 | Lin .................................... 180/907 |
| 5,944,131 | * | 8/1999 | Schaffner et al. ................ 180/65.1 |
| 5,964,473 | * | 10/1999 | Degonda et al. ................. 180/907 |

* cited by examiner

Primary Examiner—Brian L. Johnson
Assistant Examiner—Matthew Luby
(74) Attorney, Agent, or Firm—ProTechtor International Services

(57) ABSTRACT

An electrical wheelchair includes a chassis on which a seat is mounted. The chassis has a double-framed structure including a primary frame and a secondary frame pivotally connected to each other so as to be rotatable with respect to each other about a first rotational axis. Two driving wheels are mounted to the primary frame and independently driven by motors. Two rear guide wheels are rotatably and swivellingly mounted to the primary frame. The secondary frame has a front edge frontward extending beyond the primary frame with two front guide wheels rotatably and swivellingly mounted thereto whereby the front guide wheels are capable to orbit about the driving wheels by means of the pivotal connection between the primary and secondary frames so as to provide the front guide wheels and the driving wheels with excellent surface compliance when the wheelchair is moving on an uneven surface. Furthermore, the wheelchair is capable of spinning about its own central axis on both raised surfaces, recessed surfaces, and inclined surfaces.

7 Claims, 21 Drawing Sheets

ELECTRICAL WHEELCHAIR WITH DOUBLE FRAME STRUCTURE

FIELD OF THE INVENTION

The present invention generally relates to an electrical wheelchair, and in particular to an electrical wheelchair comprising a double-framed chassis for providing wheels thereof with excellent surface compliance when moving on an uneven road surface.

BACKGROUND OF THE INVENTION

Wheelchairs help those incapable to walk to move from one place to another. Conventionally, a wheelchair is driven manually by another person for moving the person seated thereon. This is generally inconvenient. An electrical wheelchair incorporates a power source, such as a battery-motor system, therein for assisting the movement of the wheelchair. The conventional wheelchairs are designed for moving on a substantially planar surface whereby turnover or other potential risk may occur when the wheelchair is moving on an uneven surface. Some of the conventional wheelchairs are equipped with tilting-resistant device for reducing the risk of tilting or turnover when moving on the uneven surface. Such tilting resistant devices are not good enough to effectively prevent the wheelchair for tilting and turnover. Some examples of the conventional wheelchairs are disclosed in U.S. Pat. Nos. 5,222,567 and 5,762,154.

Thus, it is desired to provide a wheelchair having a double-framed chassis which provides wheels thereof with excellent surface compliance when moving on an uneven surface thereby reducing the risk of turnover.

SUMMARY OF THE INVENTION

Accordingly, an object of the present invention is to provide a wheelchair comprising a chassis having a double-framed configuration for providing wheels thereof with excellent surface compliance when moving on an uneven surface thereby reducing the risk of turnover. The wheelchair is capable of spinning about its own center on all kinds of surfaces, including raised surfaces, recessed surfaces and inclined surfaces.

To achieve the above object, in accordance with the present invention, there is provided an electrical wheelchair includes a chassis on which a seat is mounted. The chassis has a double-framed structure including a primary frame and a secondary frame pivotally connected to each other so as to be rotatable with respect to each other about a first rotational axis. Two driving wheels are mounted to the primary frame and independently driven by motors. The secondary frame has a front edge frontward extending beyond the primary frame with two front guide wheels mounted thereto whereby the front guide wheels are capable to orbit about the driving wheels by means of the pivotal connection between the primary and secondary frames as to provide the front guide wheels and the driving wheels with excellent surface compliance when the wheelchair is moving on an uneven surface.

BRIEF DESCRIPTION OF THE DRAWINGS

The present invention will be apparent to those skilled in the art by reading the following description of preferred embodiments thereof, with reference to the accompanying drawings, in which.

DETAILED DESCRIPTION OF THE PREFERRED EMBODIMENTS

Figure 1:
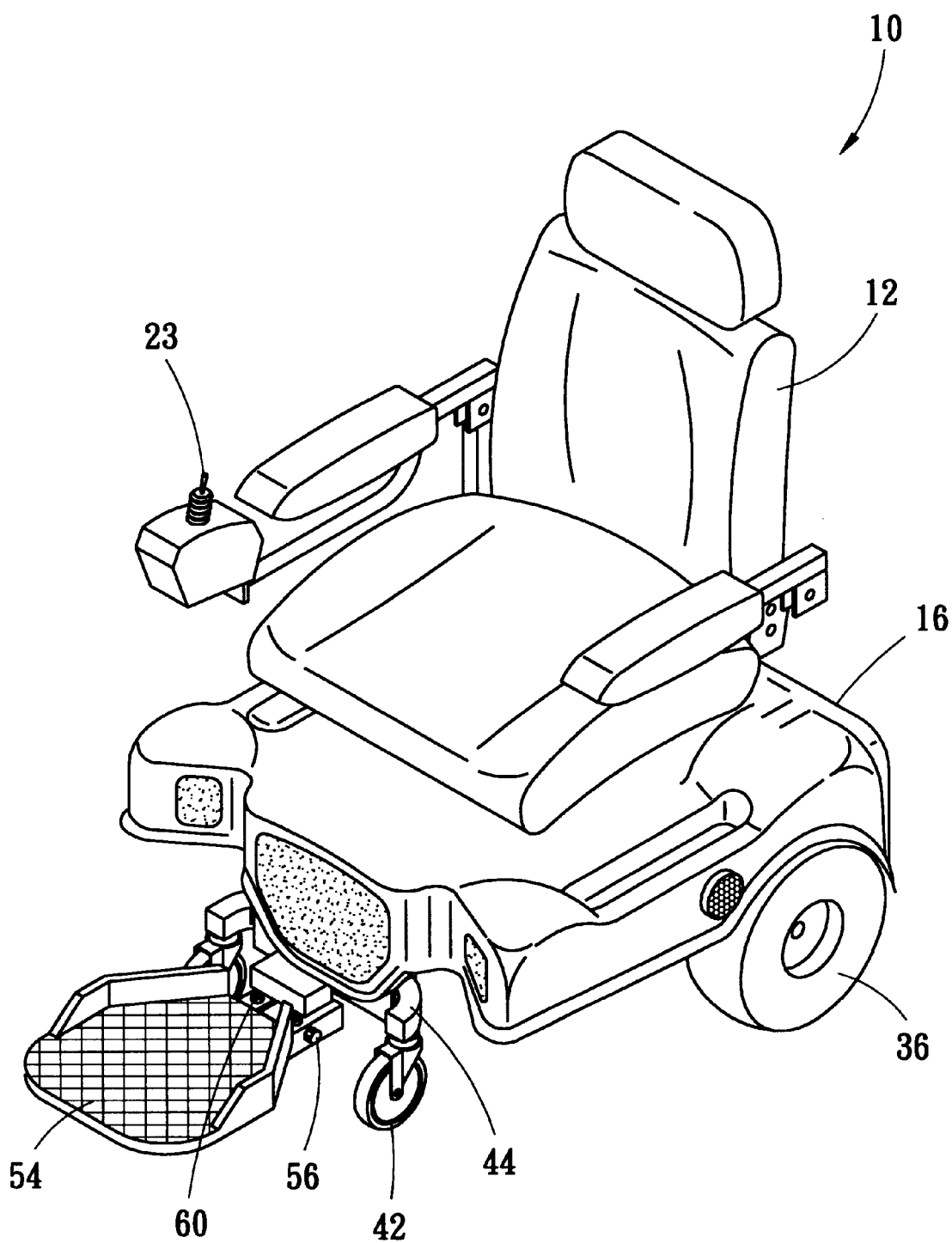
FIG. 1 is a perspective view of an electrical wheelchair constructed in accordance with the present invention.
Figure 2:
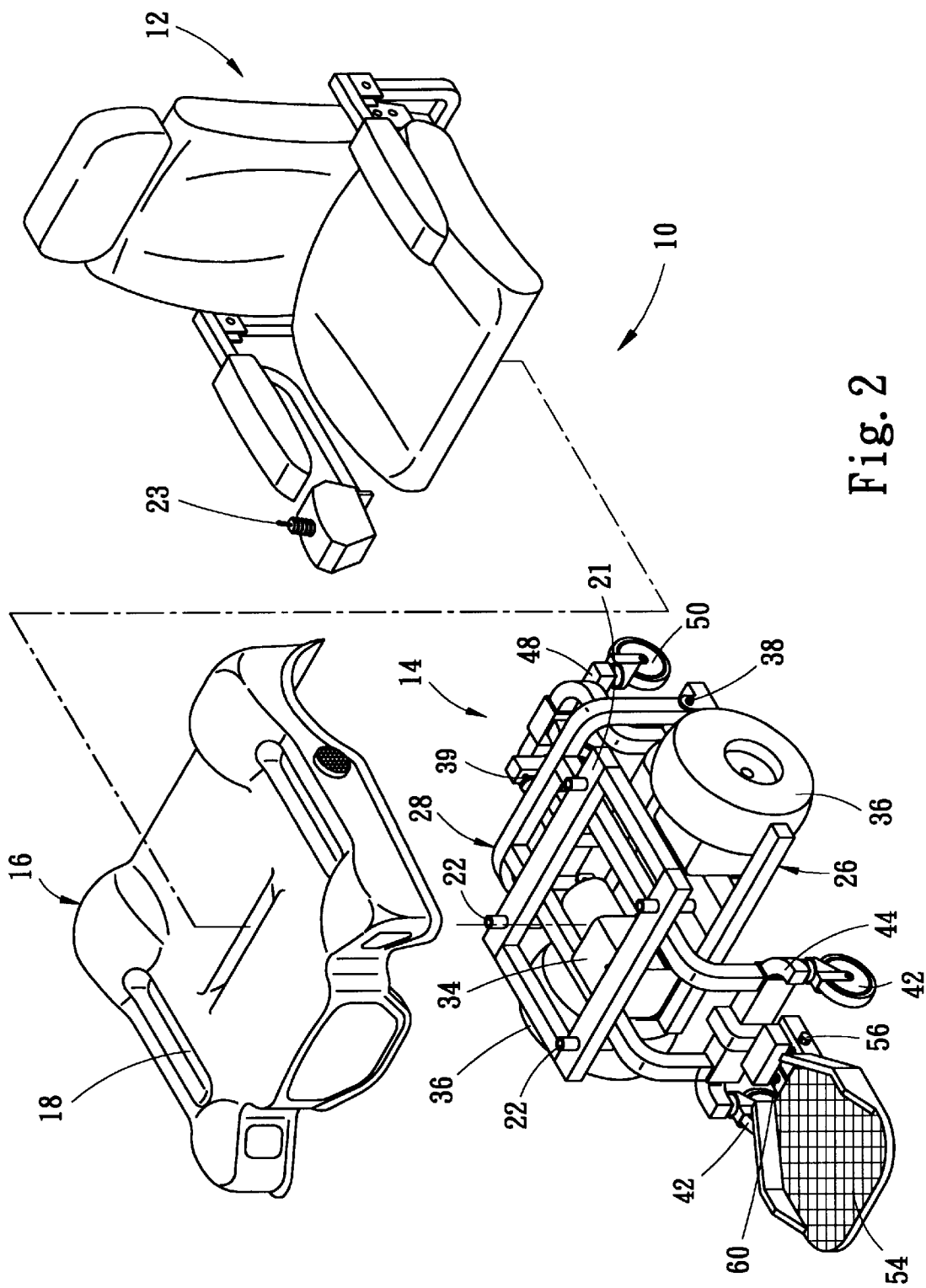
FIG. 2 is an exploded view of the electrical wheelchair of the present invention.
Figure 3:
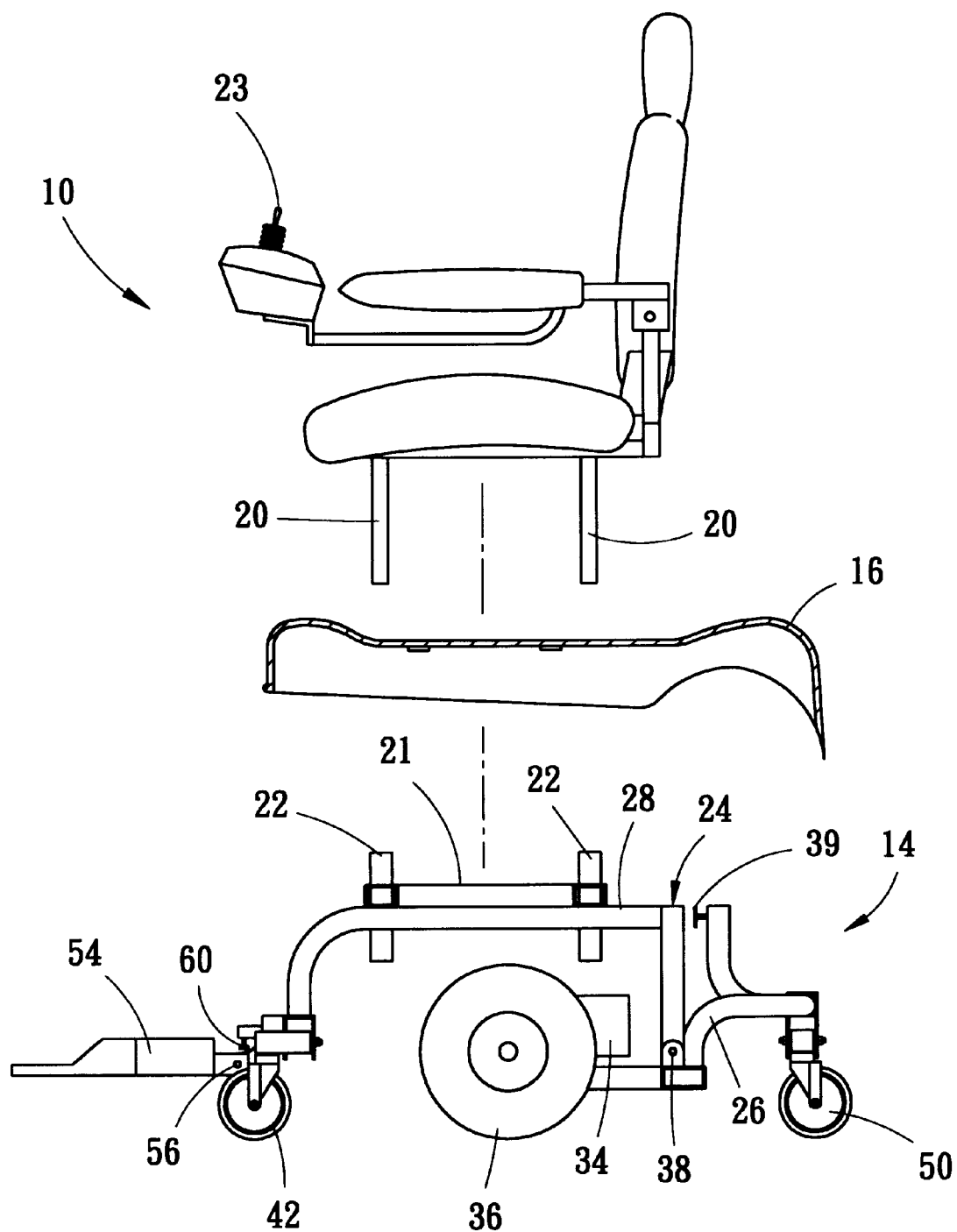
FIG. 3 is a side elevational, exploded view of the electrical wheelchair of the present invention.
Figure 4:
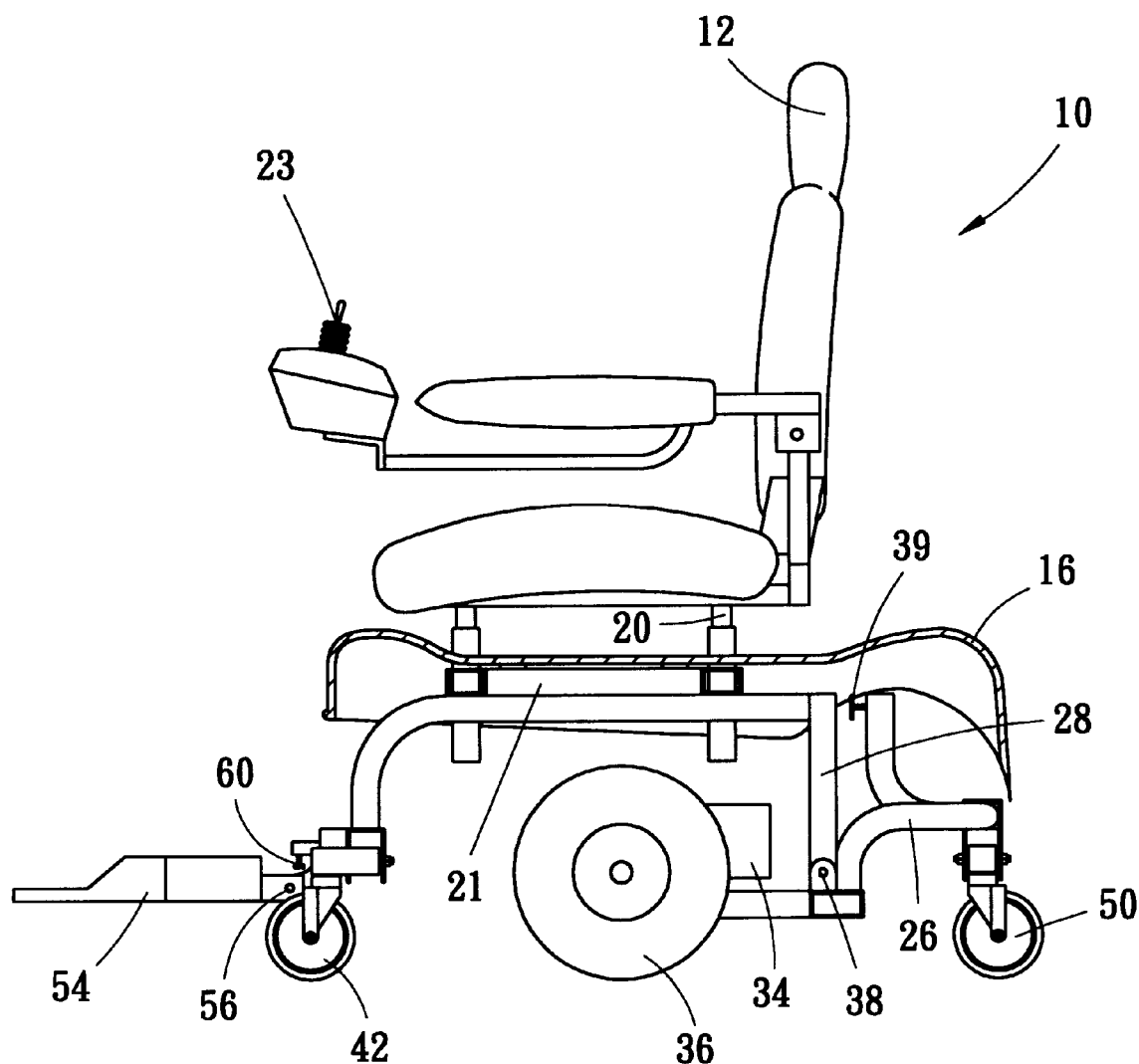
FIG. 4 is a side elevational view of the electrical wheelchair of the present invention.

With reference to the drawings and in particular to FIGS. 1–4 wherein an electrical wheelchair constructed in accordance with the present invention, generally designated by reference numeral 10, is shown, the electrical wheelchair 10 comprises a seat 12 mounted on a chassis 14. The seat 12 may be directly mounted to the chassis 14 or alternatively, as shown in the drawings, the seat 12 is mounted to a supporting base 16 which is in turn fixed to the chassis 14. The supporting base 16 may be fixed to the chassis 14 by any known means, such as bolts (not shown). Through holes 18 are defined in the supporting base 16 for receiving depending bars 20 extending from an underside of the seat 12. The bars 20 extend beyond a bottom side of the supporting base 16 for inserting into receptacles 22 formed on a mounting member 21 fixed on the chassis 14 thereby fixing the seat 12 to the chassis 14. A manual control device 23 is provided on the seat 12 for manual control of the electrical wheelchair 10.

Figure 5:
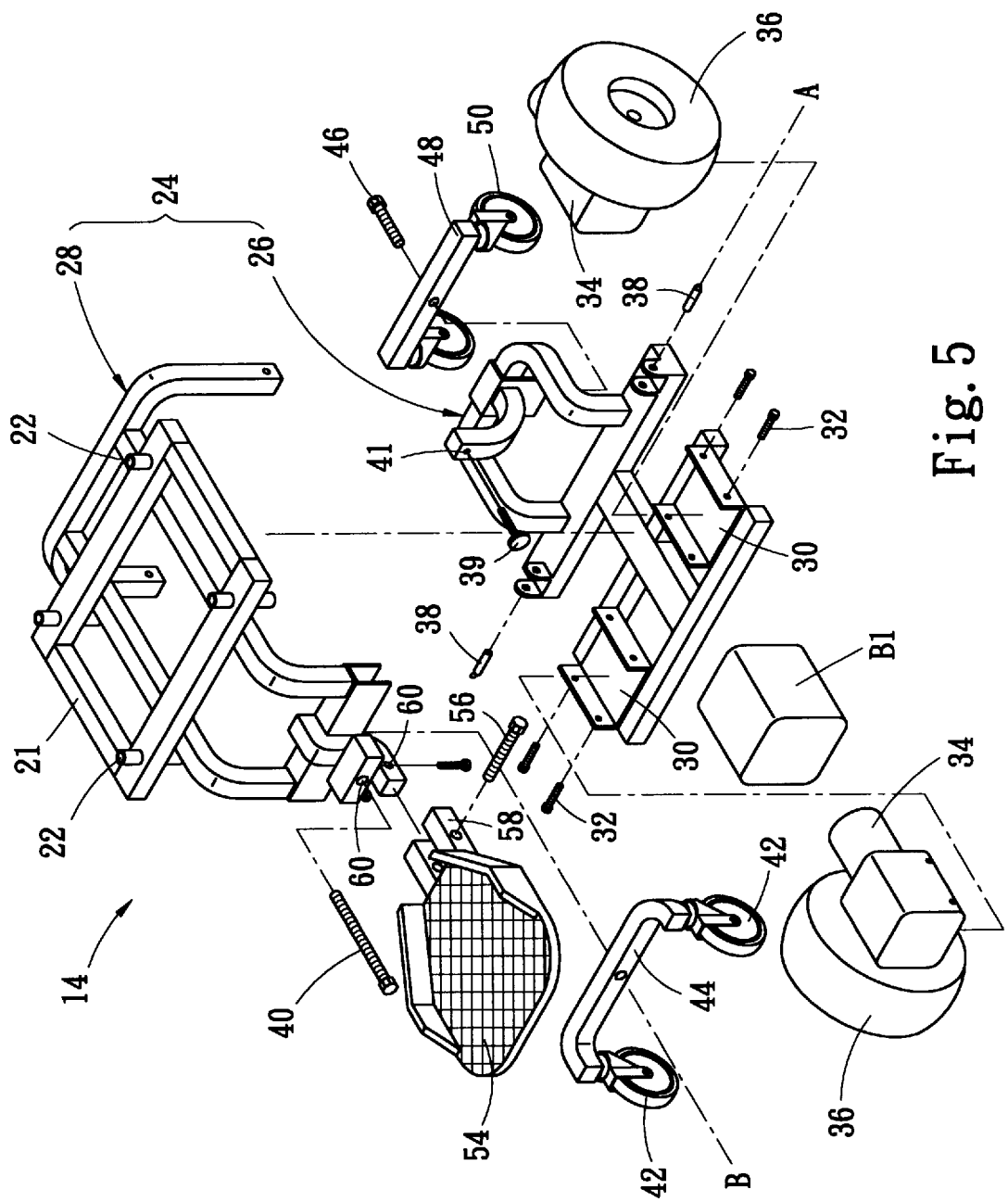
FIG. 5 is an exploded view of a chassis of the electrical wheelchair of the present invention.
Figure 6:
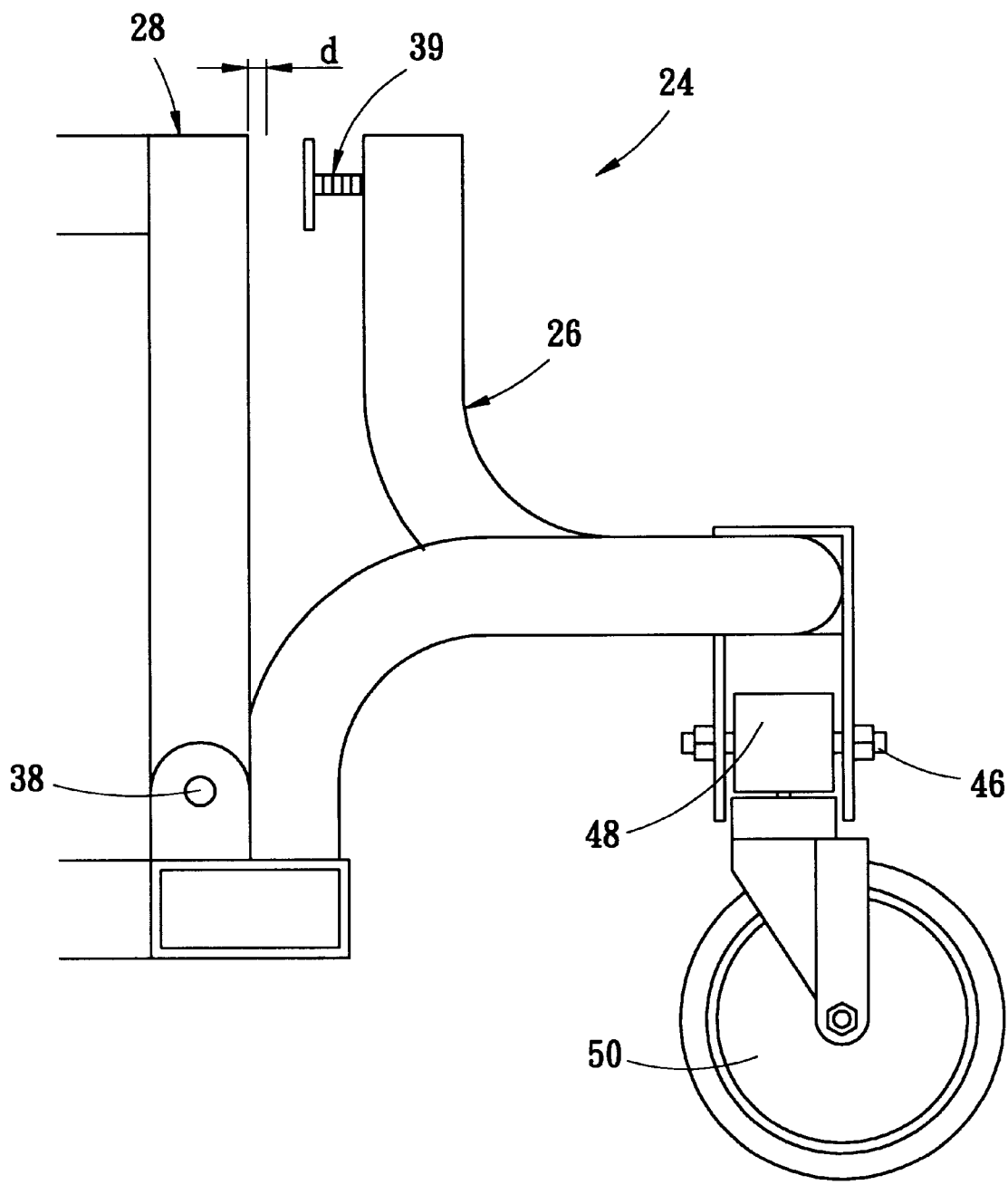
FIG. 6 is an expanded view of a portion of the chassis showing a pivotal connection between a primary frame and a secondary frame of the chassis.

Also referring to FIGS. 5 and 6, the chassis 14 has a double-framed structure comprising a primary frame 26 and a secondary frame 28 pivoted to each other. Two motor support members 30 are mounted on the primary frame 26 on opposite sides thereof for retaining motor-transmission systems 34 by means of bolts 32. The motor-transmission systems 34 are mechanically coupled to driving wheels 36, respectively, and are controlled by the manual control device 23 to actuate the driving wheels 36 for moving the electrical wheelchair 10. Power supply B 1 is also mounted on the primary frame 26 for powering the motor transmission systems 34.

The secondary frame 28 is pivoted to the primary frame 26 by two pivots 38 which are axially aligned with each other and defines a first rotational axis A extending in a transverse direction of the chassis 14. The primary and secondary frames 26, 28 are rotatable with respect to each other about the first rotational axis A.

First rotation limitation means is provided between the primary and secondary frames 26, 28 for limiting relative angular displacement of the secondary frame 28 with respect to the primary frame 26. In the embodiment illustrated, the rotation limitation means comprises a first limiting bolt 39 which threadingly engages with an inner-threaded hole 41 defined in the primary frame 26 and has a free end or bolt head (not labeled) spaced from the secondary frame 28 a distance d (as shown in FIG. 6). When the secondary frame 28 is moved toward the primary frame 27 through the distance d, the secondary frame 28 contacts the first limiting bolt 39 thereby limiting further rotation of the secondary frame 28 with respect to the primary frame 26. The distance d is adjustable by rotating the bolt 39 with respect to the primary frame 26 thereby adjusting the relative rotation between the primary and secondary frames 26, 28.

The secondary frame 28 has a front edge extending beyond the primary frame 26 in a longitudinal direction of the chassis 14. Two front guide wheels 42 are fixed to a front cross bar 44 which is pivoted to the front edge of the secondary frame 28 by means of a pivot 40. The pivot 40 defines a second rotational axis B which extends in the longitudinal direction of the chassis 14 and substantially perpendicular to the first rotational axis A. The front guide wheels 42 are rotatable about the second rotational axis B with respect to the secondary frame 28 which allows the front cross bar 44 to be inclined leftward or rotated counterclockwise (FIG. 7) or rightward or rotated clockwise (FIG. 8). In the embodiment illustrated, the pivot 40 is a bolt. By means of the first rotational axis A, a central axis of the front guide wheels 42 themselves is allowed to rotate about the first rotational axis A with respect to a central axis of the driving wheels 36. In other words, the front guide wheels 42 are allowed to orbit about the driving wheels 36.

Figure 7:
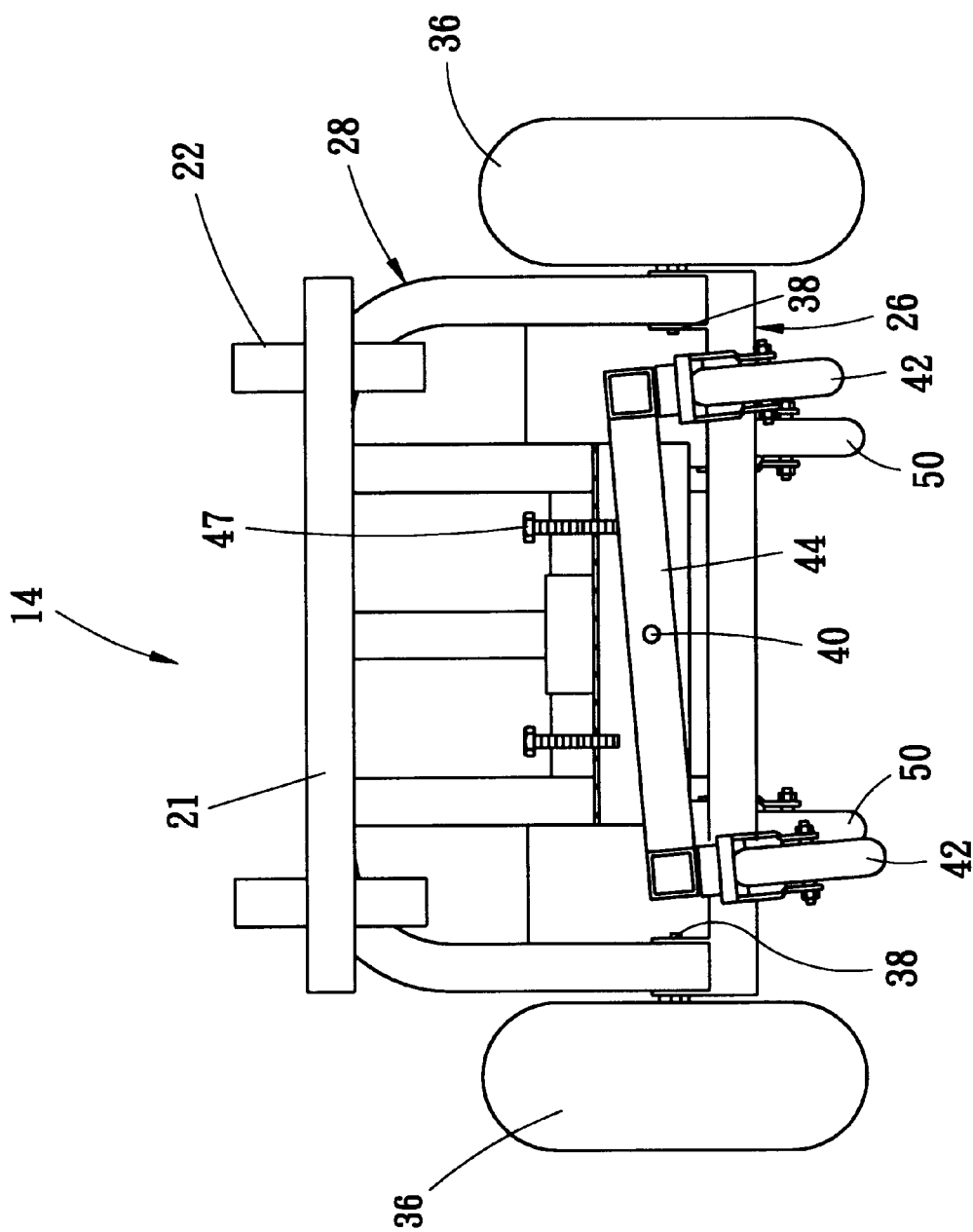
FIG. 7 is a front view showing a leftward (counterclockwise) rotation of a front cross bar of the chassis of the electrical wheelchair of the present invention.
Figure 8:
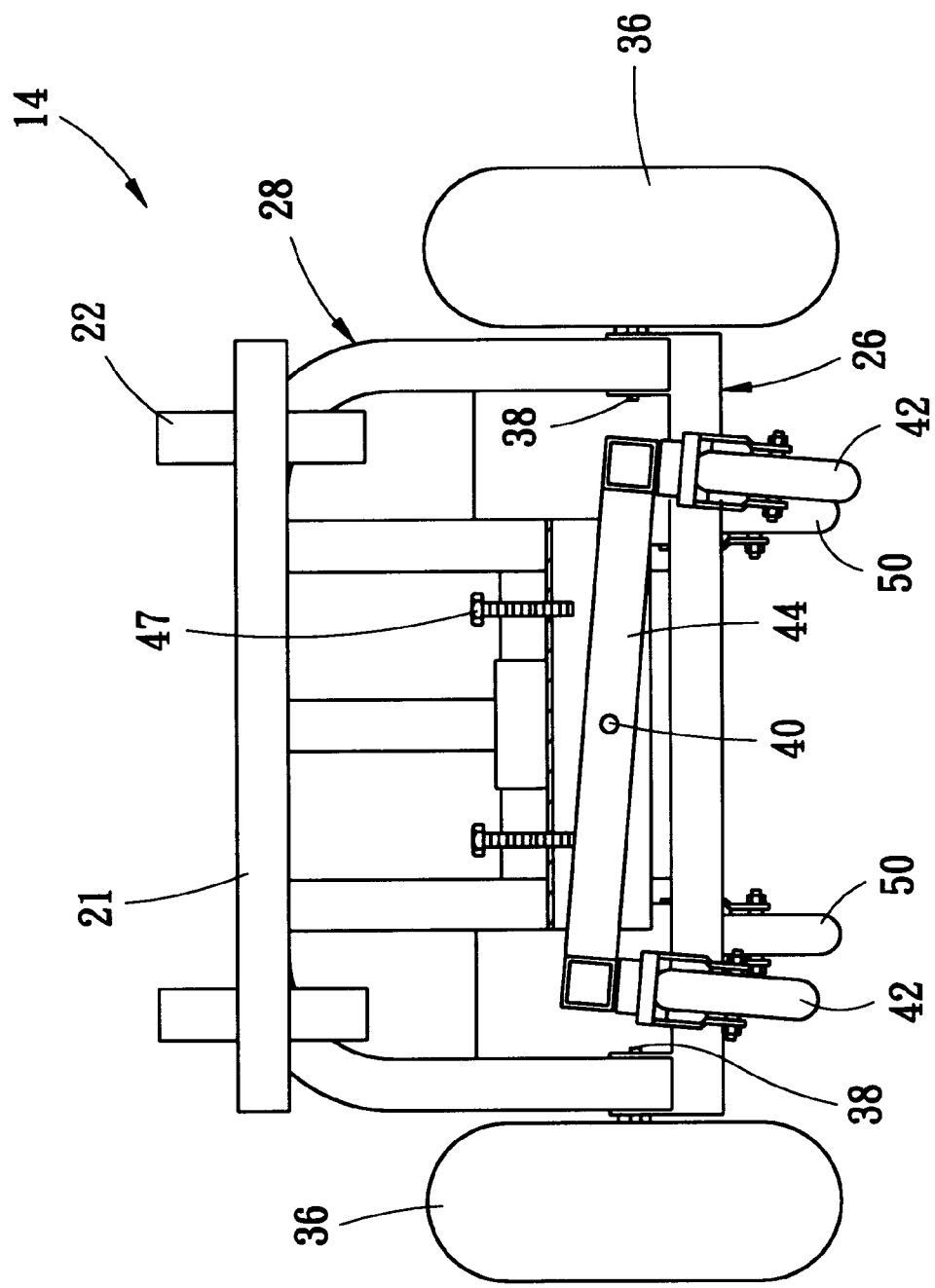
FIG. 8 is a front view showing a rightward (clockwise) rotation of the front cross bar of the chassis of the electrical wheelchair of the present invention.

As shown in FIGS. 7 and 8, second rotation limiting means is provided on the secondary frame 28 for limiting relative rotation of the front cross bar 44 with respect to the secondary frame 28. The second rotation limiting means comprises two second limiting bolts 47 respectively mounted on two sides of the pivot 40, each having a free end spaced from the front cross bar 44 a predetermined distance which defines an allowable angular displacement that the front cross bar 44 may take before the front cross bar 44 contacts the second limiting bolts 46 in a clockwise or counterclockwise rotation.

Figure 9:
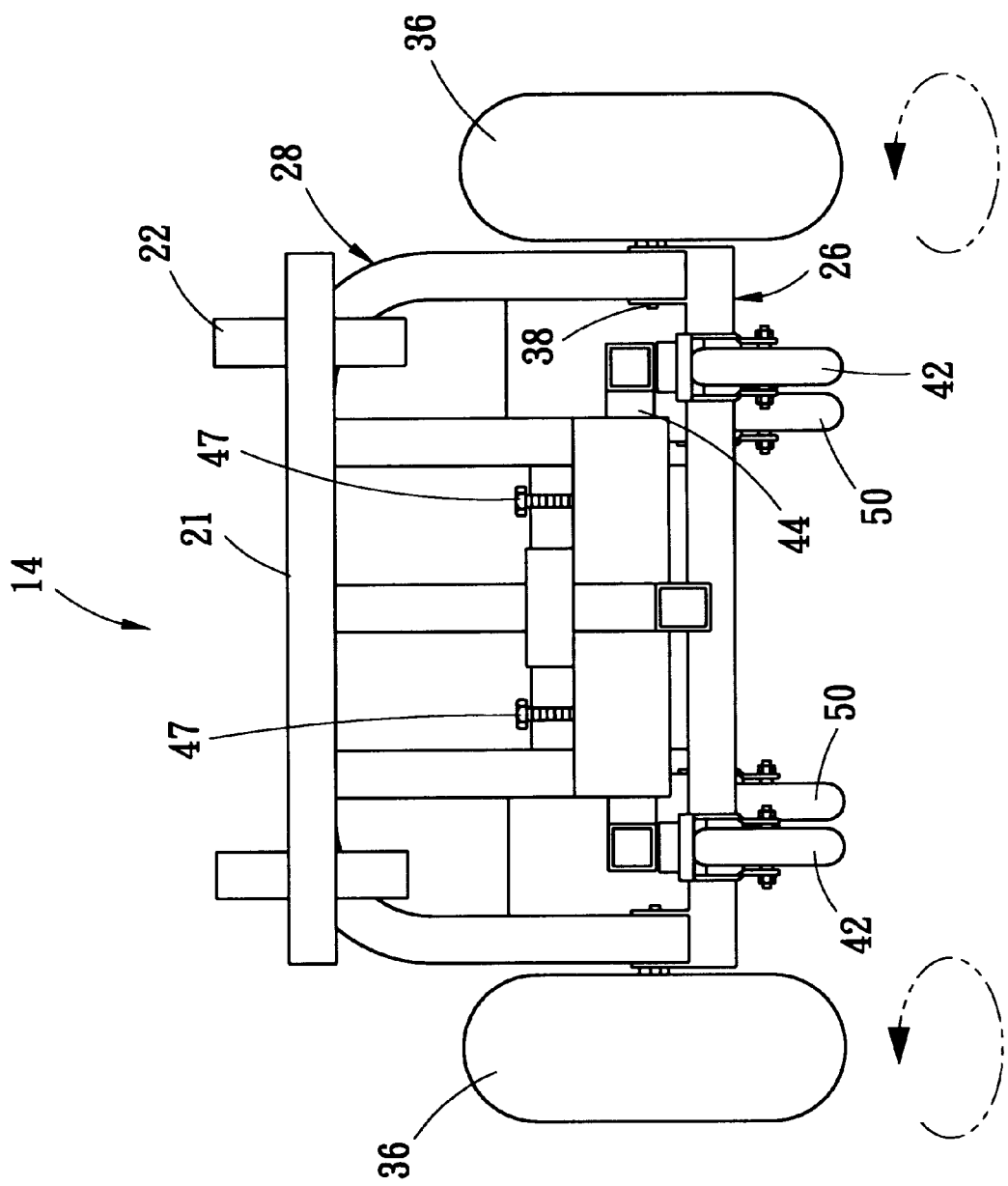
FIG. 9 is a front view of the chassis of the electrical wheelchair of the present invention.
Figure 10:
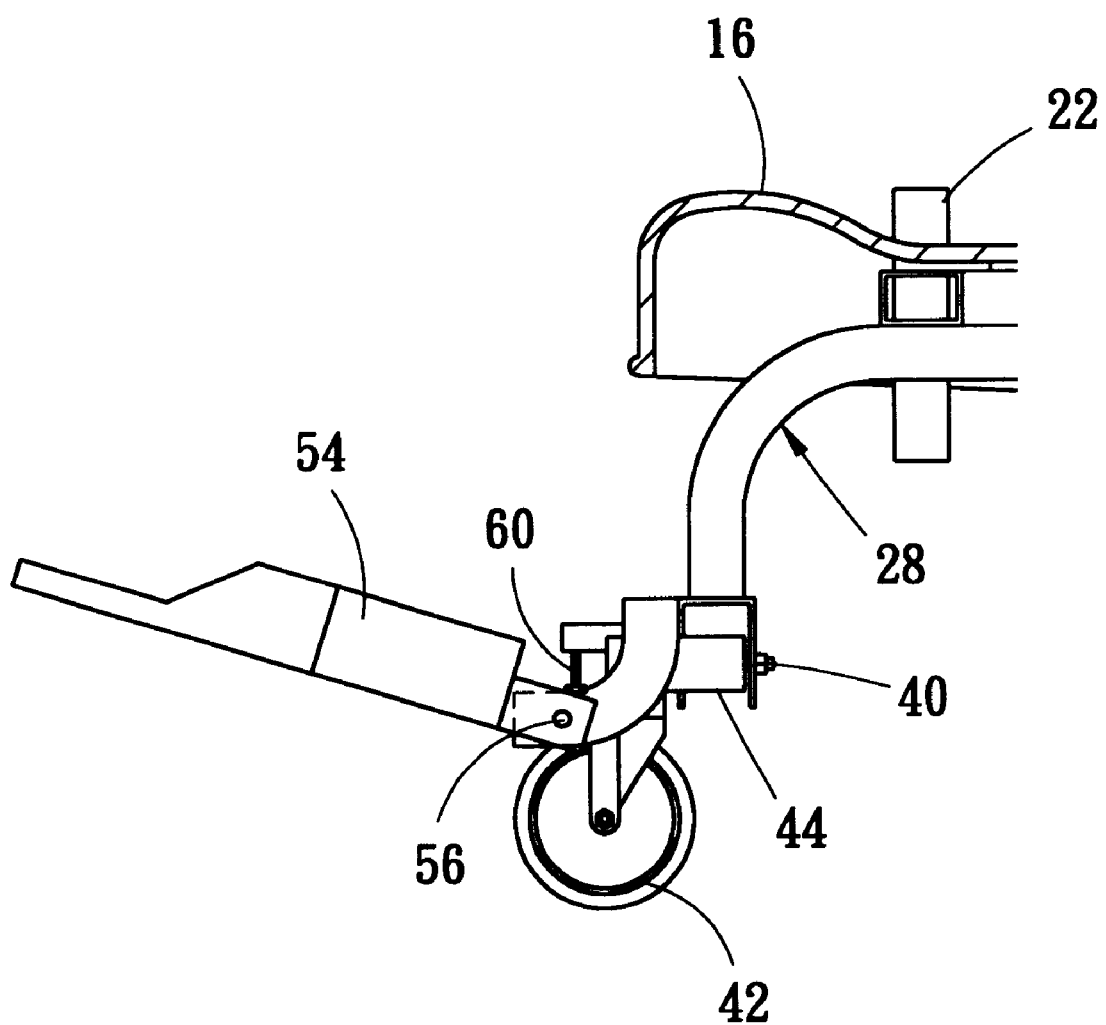
FIG. 10 is a side elevational view of a pedal of the chassis of the electrical wheelchair of the present invention.

The front guide wheels 42 are rotatably mounted to the front cross bar 44. As shown in FIG. 9, each front guide wheel 42 is capable of rotating with respect to the front cross bar 44 about a vertical rotational axis that is perpendicular to both the first rotational axis A and the second rotational axis B. Such a rotatably mounted wheel is generally known and no further detail will be given herein. However, it should be noted that the electrical wheelchair 10 is designed to have a gravity center thereof exactly located above the driving wheels 36 whereby when the wheelchair 10 is rotated about a central axis thereof, no turnover of the wheelchair may occur. The driving wheels 36 are designed to turn independently thereby allowing only one of the driving wheels 36 to be driven, while the other one is not and the wheelchair 10 spins about its own central axis.

As shown in FIGS. 5 and 6, a rear cross bard 48 is pivoted to a rear edge of the primary frame 26 by means of a pivot 46 (a bolt in this case) that is substantially parallel to the second rotational axis B. Two rear guide wheels 50 are mounted to the rear cross bar 48. By means of the pivots 38 and the pivot 46 (or pivot 40), the rear guide wheels 50 may rotate with respect to the front guide wheel 42 about the transverse direction (the first rotational axis A) and the longitudinal direction (the second rotational axis B) thereby providing the front and rear guide wheels 42, 50 with excellent properties of surface compliance with contours of roads on which the wheelchair 10 is moving.

Figure 13:
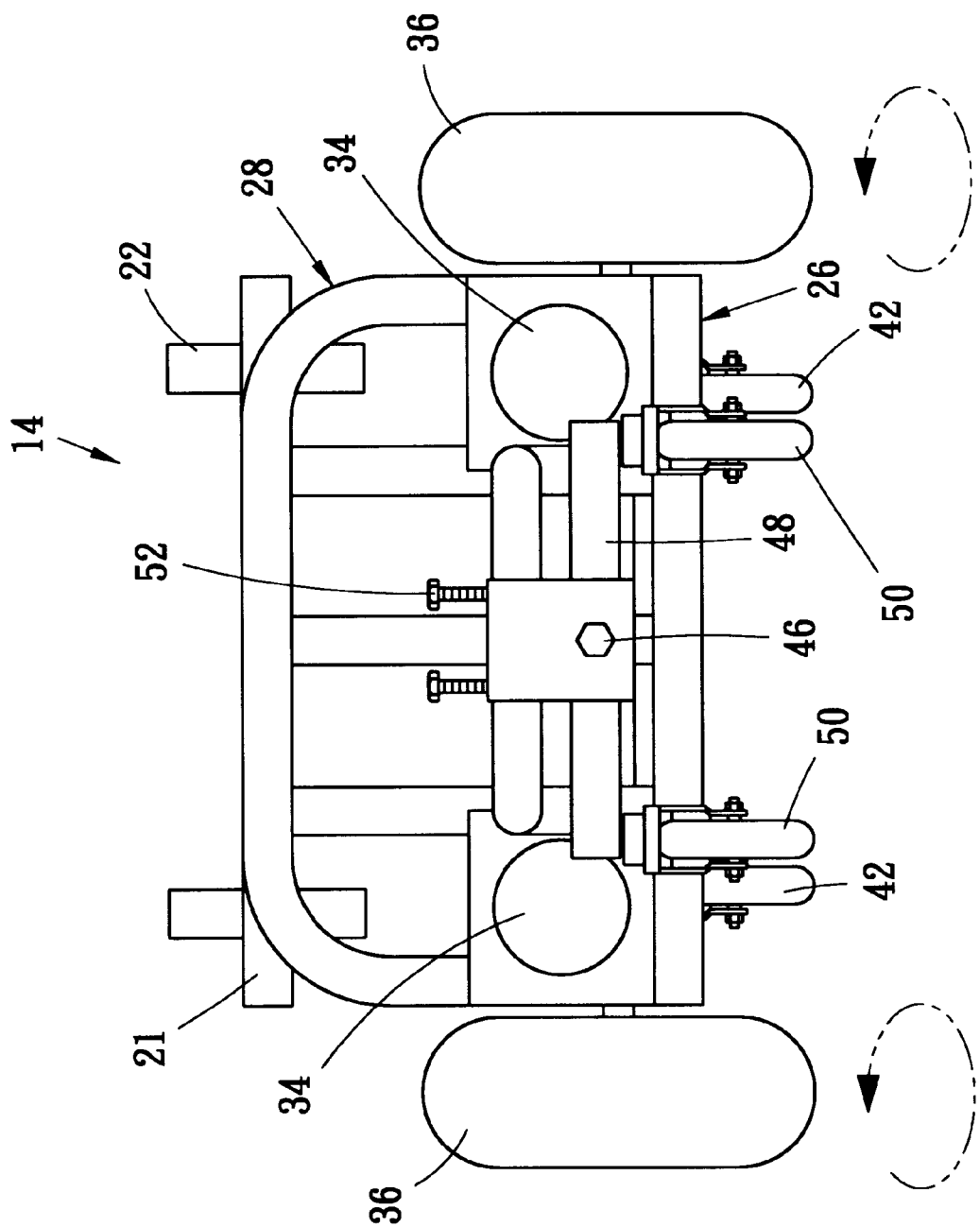
FIG. 13 is a rear view of the chassis of the electrical wheelchair of the present invention.

Preferably, as shown in FIG. 13 and similar to the front guide wheels 42, the rear guide wheels 50 are rotatable about vertical axis thereof with respect to the rear cross bar 48.

Figure 11:
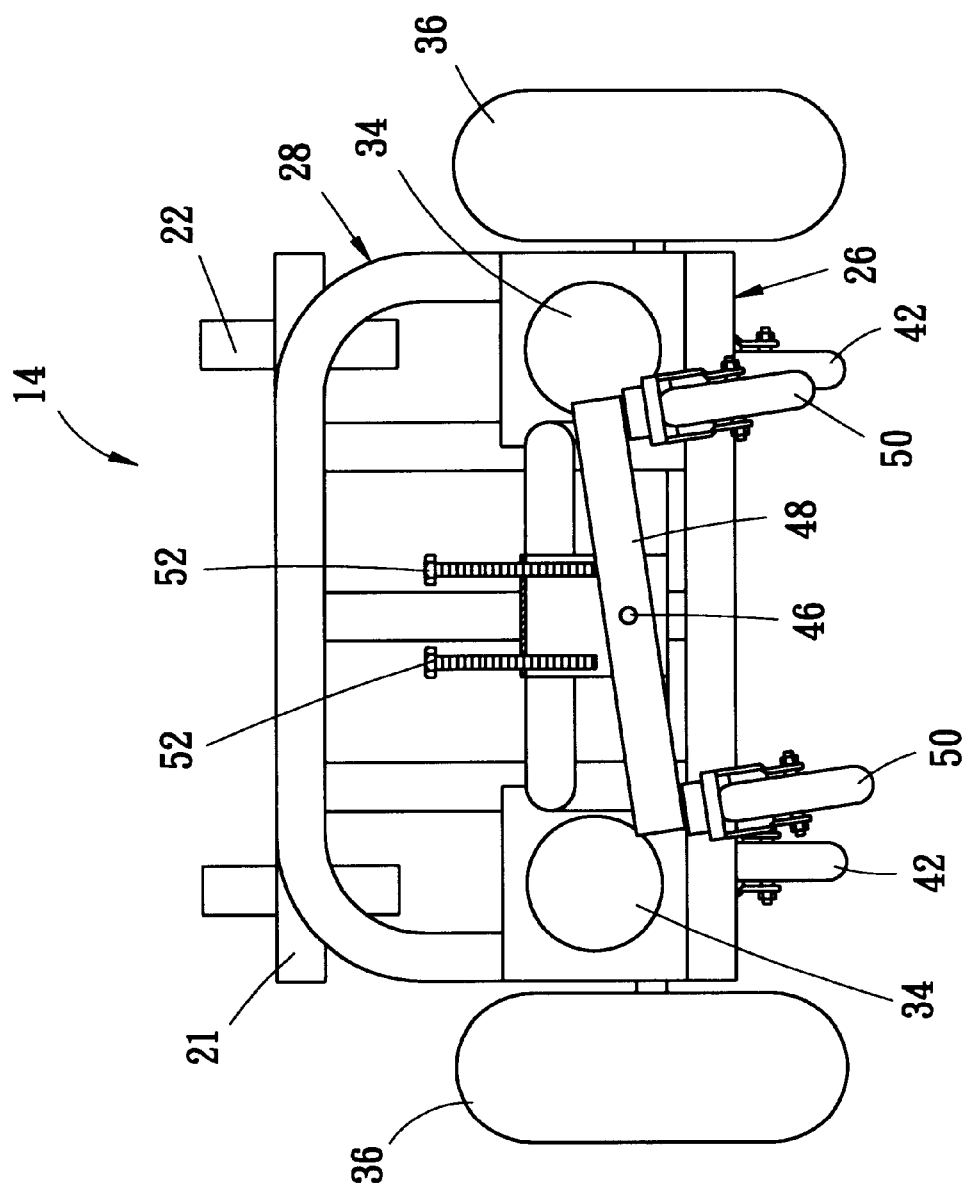
FIG. 11 is a rear view showing a leftward (counterclockwise) rotation of a rear cross bar of the chassis of the electrical wheelchair of the present invention.
Figure 12:
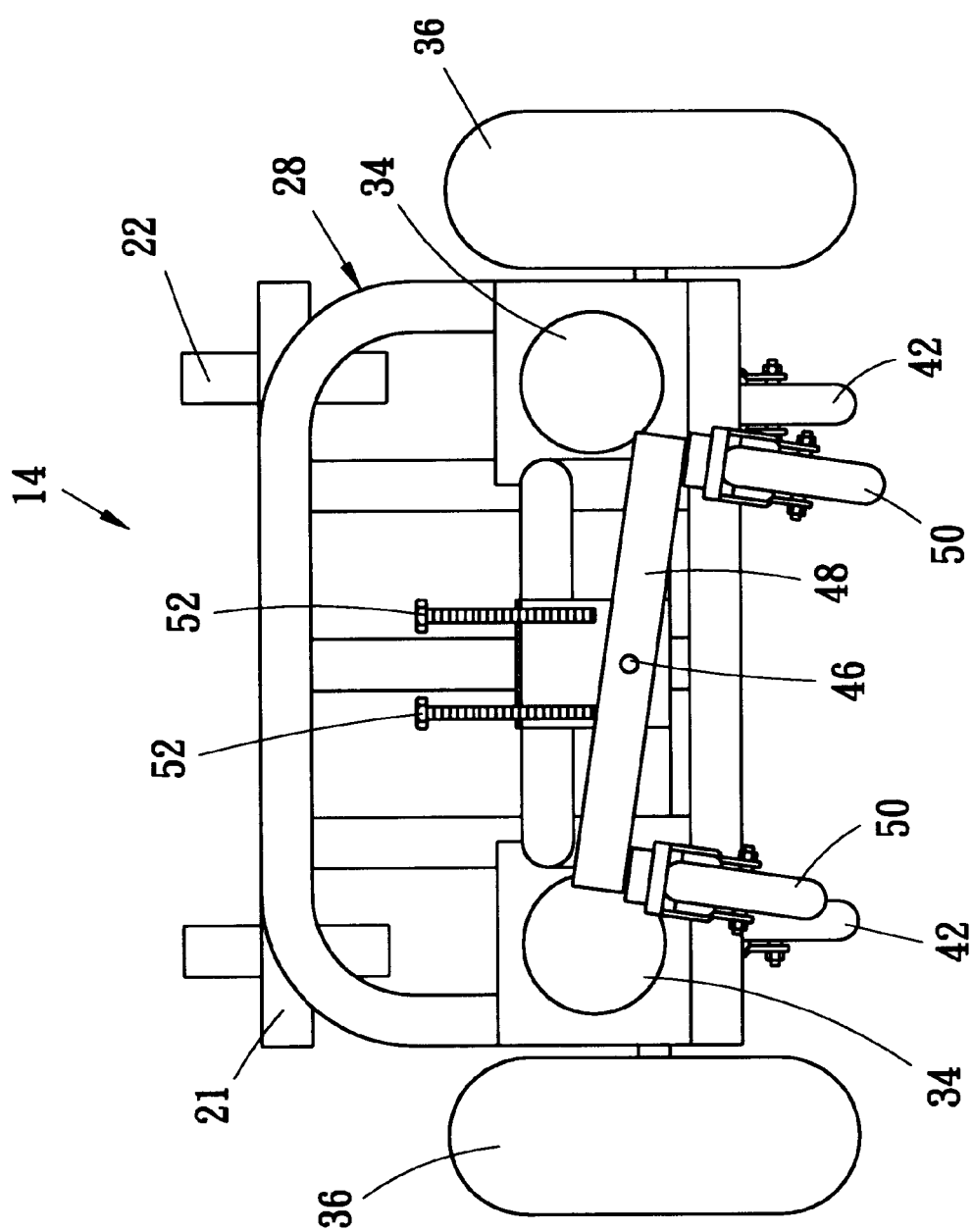
FIG. 12 is a rear view showing a rightward (clockwise) rotation of the rear cross bar of the chassis of the electrical wheelchair of the present invention.

As shown in FIGS. 11 and 12, two third limiting bolts 52 are mounted to the primary frame 26 on two sides of the pivot 46 for limiting relative rotation of the rear cross bar 48 with respect to the primary frame 26. Free ends of the bolts 52 are spaced from the rear cross bar 48 a predetermined distance which allows the rear cross bar 48 to rotate clockwise and/or counterclockwise an angle corresponding to the predetermined distance. The third limiting bolts 52 are threadingly mounted to the primary frame 26 whereby by rotating the bolts 52 with respect to the primary frame 26, the distance between the free ends of the bolts 52 and the rear cross bar 48 is adjustable. Therefore, the angle that the rear cross bar 48 may rotate is adjustable.

Figure 14:
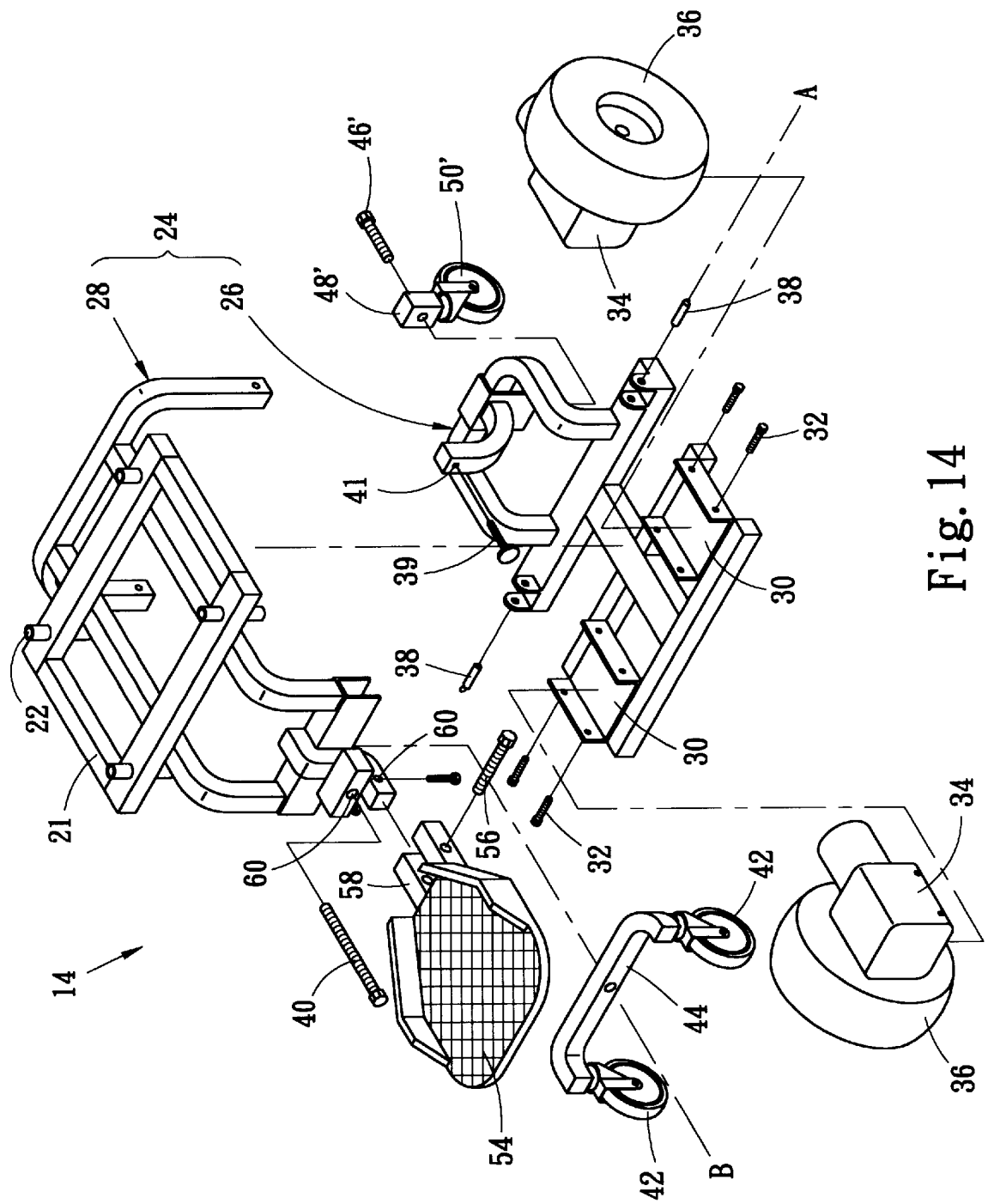
FIG. 14 is an exploded view of a chassis of an electrical wheelchair constructed in accordance with a second embodiment of the present invention.
Figure 15:
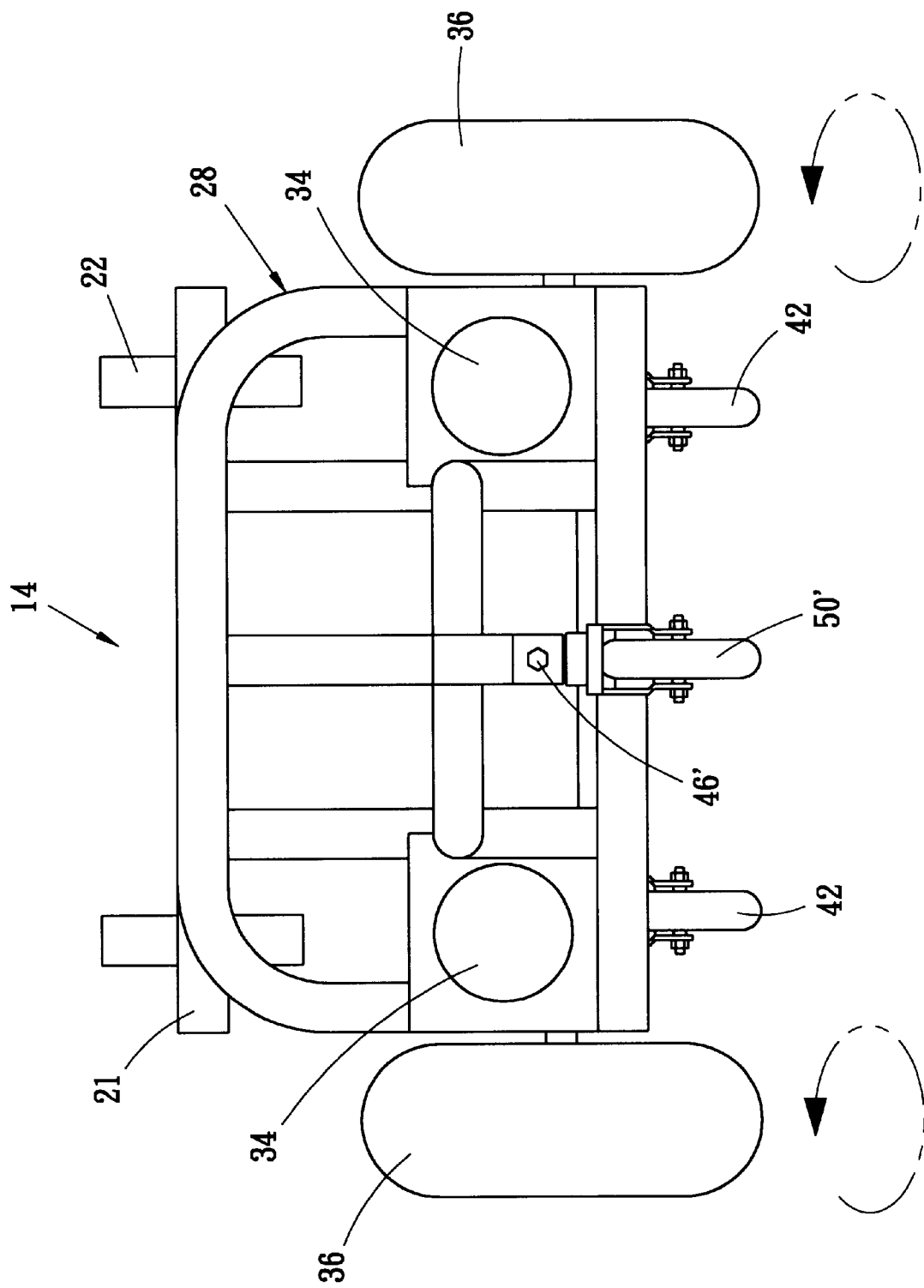
FIG. 15 is a rear view of the chassis of the electrical wheelchair of the second embodiment of the present invention.

In another embodiment of the present invention shown in FIGS. 14 and 15, only one rear guide wheel 50' is employed. The single rear guide wheel 50' is mounted to a support block 48' which is in turn pivoted to the primary frame 26 by means of a pivot 46' which extends in the direction of the second rotational axis B. The rear guide wheel 50' is also rotatable about a vertical axis. In this case, the support block 48' takes the place of the rear cross bar 48 and the third limiting blots 52 are omitted.

Referring to FIGS. 2–5 again, a pedal 54 is mounted to a front edge of the secondary frame 28 by means of a pivot 56 which is a bolt in this embodiment. A rearward extension 58 of the pedal 54 abuts against a position adjusting bolt 60 for retaining the pedal 54 at a selected position with respect to the secondary frame 28. The position adjusting bolt 60 is threadingly mounted to the secondary frame 28 whereby by rotating the bolt 60 with respect to the secondary frame 28, the angular position of the pedal 54 is adjustable.

Figure 16:
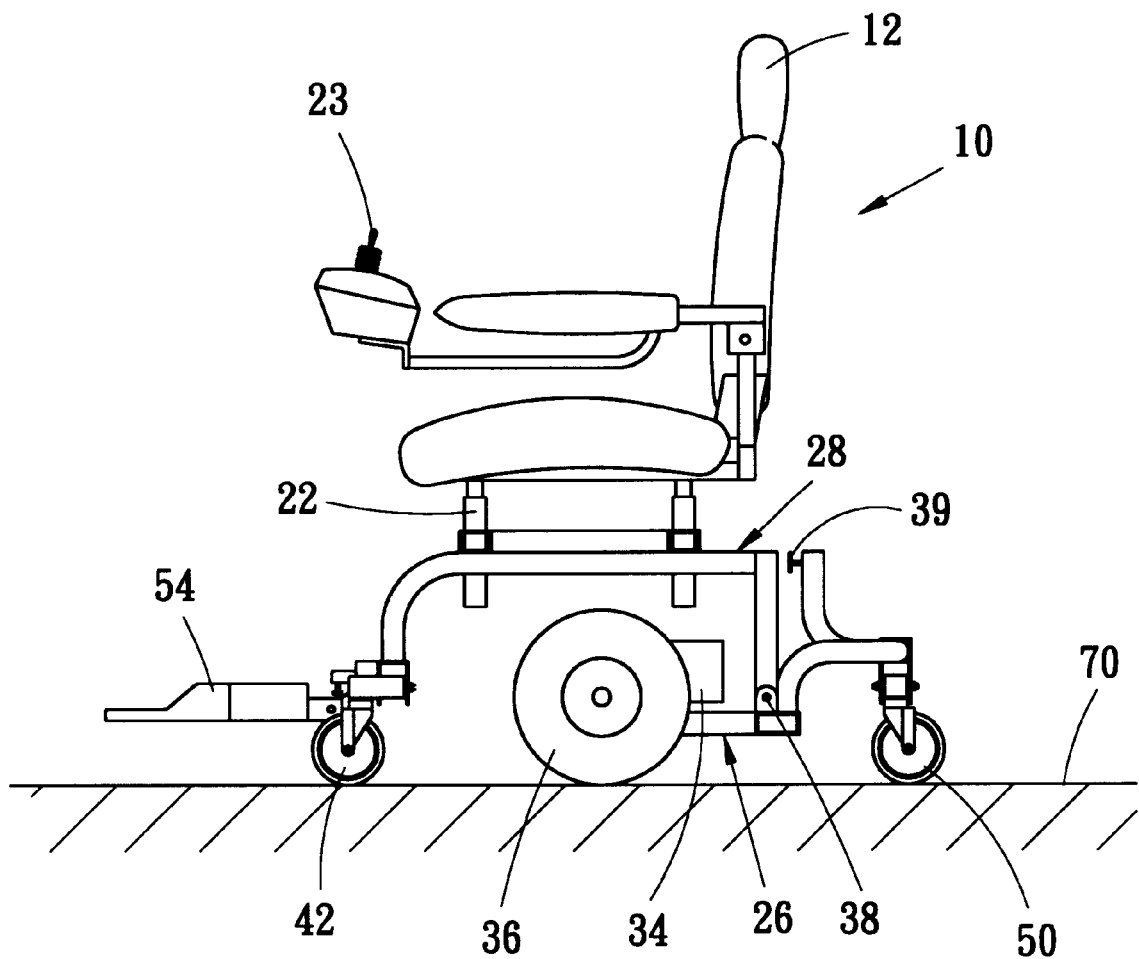
FIG. 16 is a side elevational view showing the electrical wheelchair of the present invention moving on a planar surface.
Figure 17:
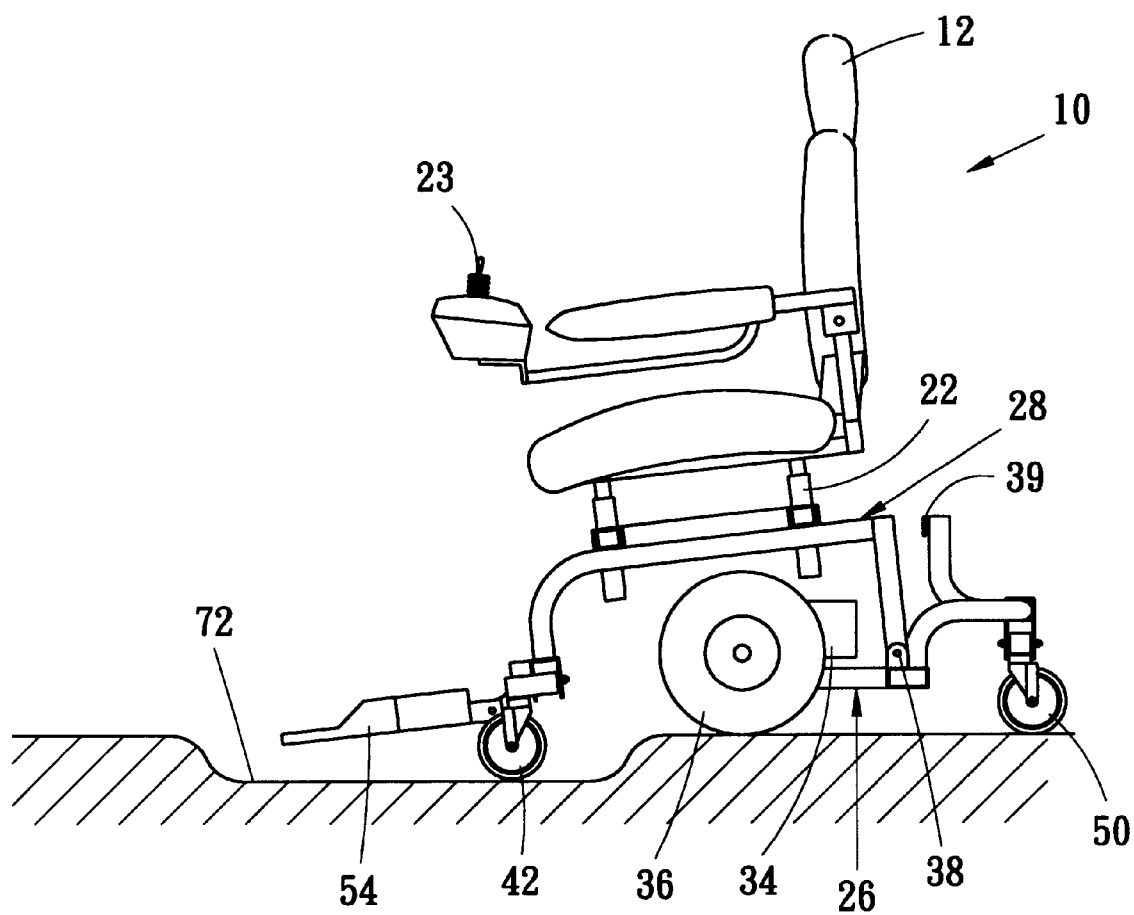
FIGS. 17 and 18 are side elevational views showing the electrical wheelchair of the present invention moving on a recessed surface.
Figure 18:
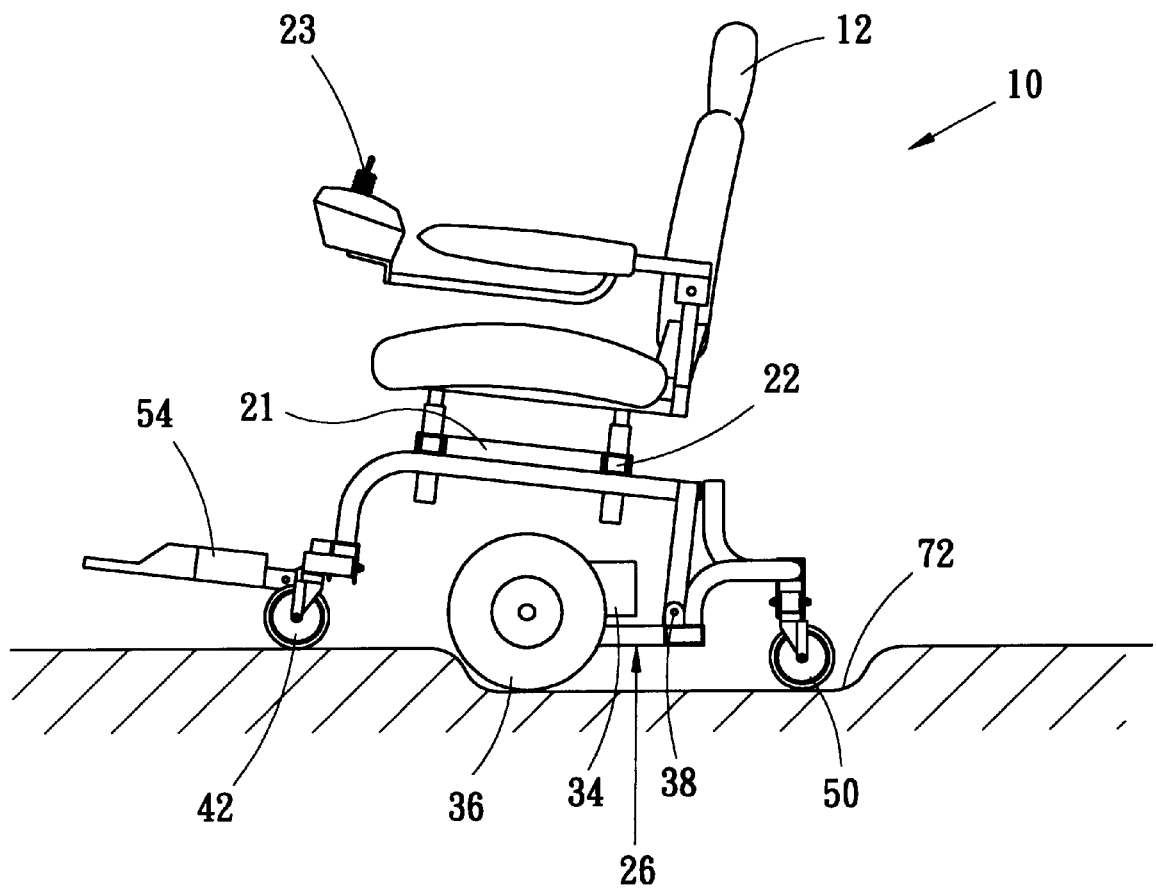
Figure 19:
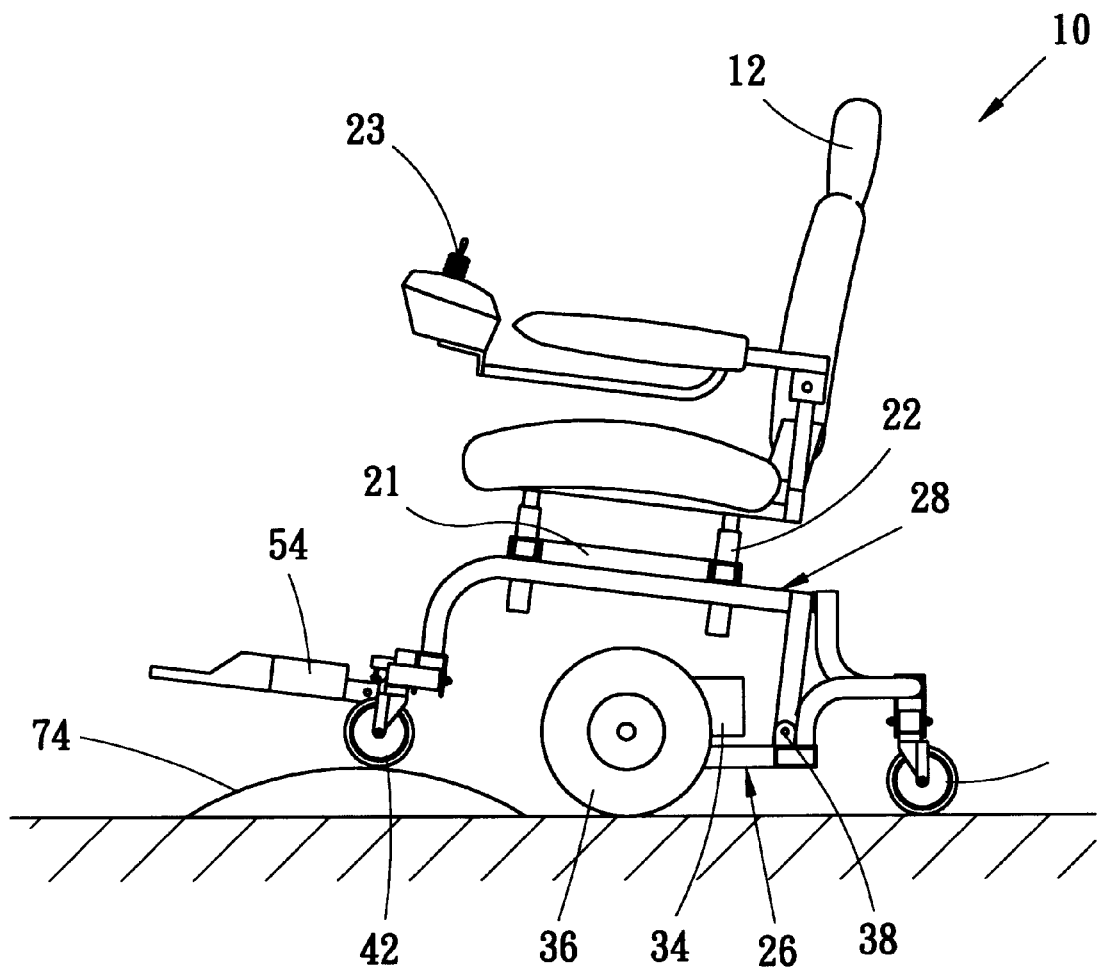
FIGS. 19 and 20 are side elevational views showing the electrical wheelchair of the present invention moving on a raised surface.
Figure 20:
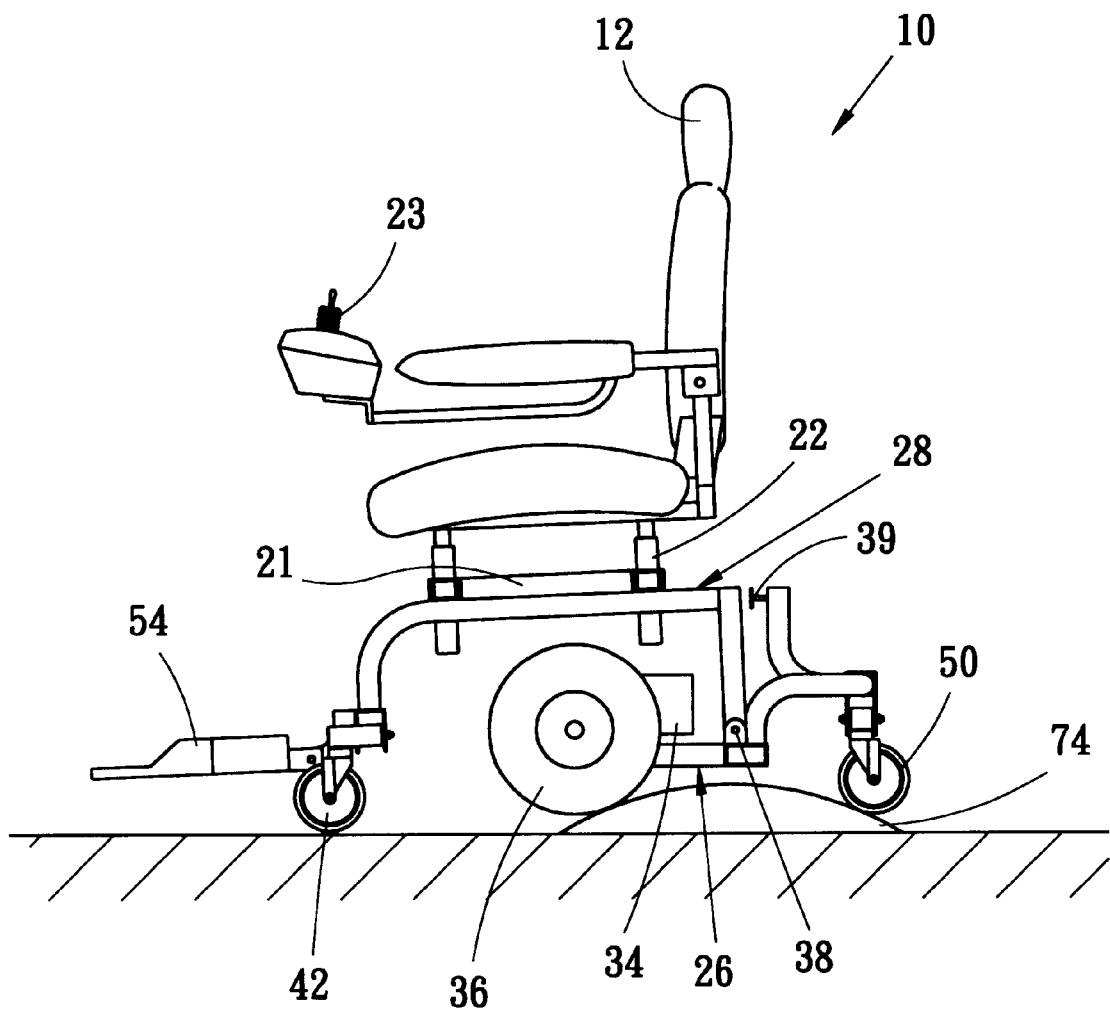
Figure 21:
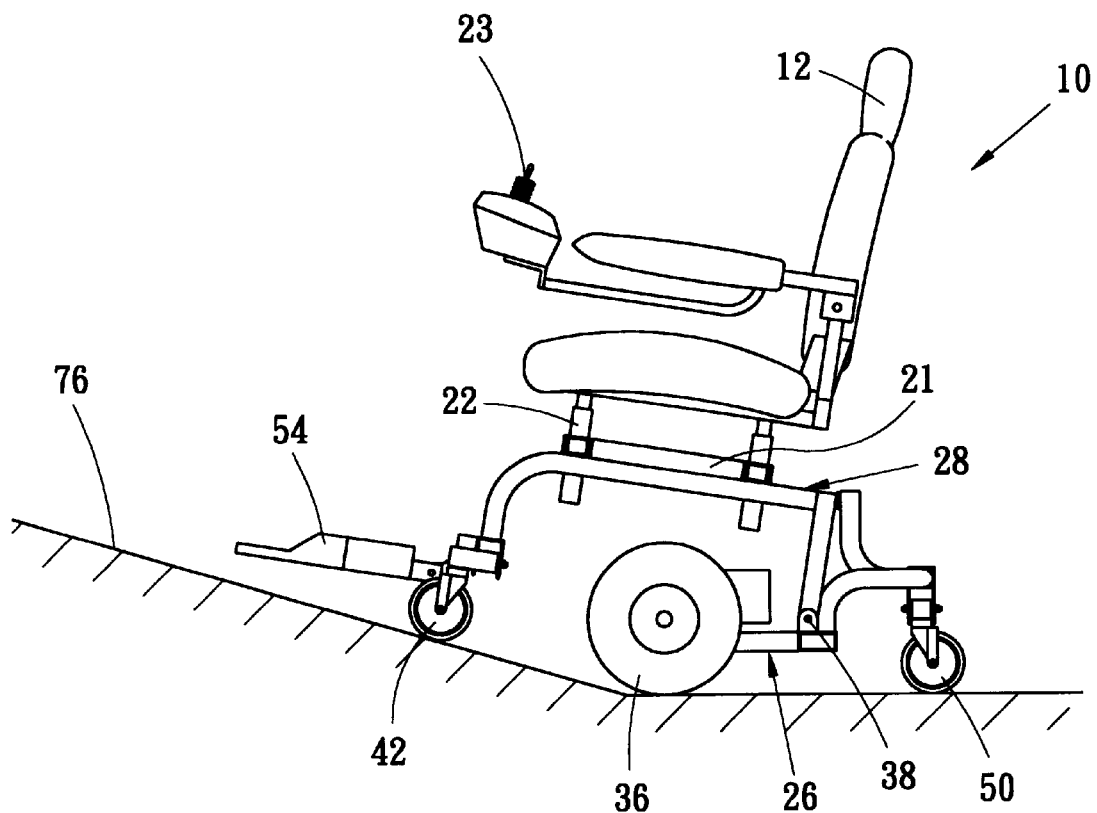
FIG. 21 is a side elevational view showing the electrical wheelchair of the present invention moving on an inclined surface.

FIGS. 16–21 show conditions when the wheelchair 10 is moving on a planar surface, a recessed surface, a raised surface and an inclined surface. FIG. 16 shows the wheelchair 10 moving on a planar surface 70 wherein the driving wheels 36 and the front guide wheels 42 may simultaneously contact the surface 70 by means of the pivotal relationship therebetween formed by the pivots 38 or the first rotational axis A. When moving on a recessed surface 72 as shown in FIGS. 17 and 18, the pivots 38 allow the secondary frame 28 to rotate with respect to the primary frame 26 thereby allowing the front guide wheels 42 and the driving wheels 36 to be positioned on different levels with excellent compliance with the recessed surface. FIGS. 19 and 20 show the wheelchair 10 moving on a raised surface 74. Similarly, due to the pivots 38, the secondary frame 28 may rotate with respect to the primary frame 26 when the wheelchair 10 is moving through the raised surface 74 thereby allowing the front guide wheels 42 and the driving wheels 36 to be positioned on different levels with compliance with the raised surface. FIG. 21 shows the wheelchair 10 is moving on an inclined surface 76. Both the front guide wheels 42 and the driving wheels 36 are maintained in contact with the inclined surface and horizontal surface due to the first rotational axis A (pivots 38). The second rotational axis B provides the front and rear guide wheels 42, 50 with excellent surface compliance with any uneven surface.

The detailed structure described above and illustrated in the drawings is only the preferred embodiments of the present invention for description purposes, not to limit the scope of the present invention. Modifications, variations and substitutions of the elements and/or the structure of the present invention are considered within the scope of the present invention that is intended to be defined by the appended claims be defined by the appended claims.

What is claimed is:

1. A wheelchair comprising:
   a chassis on which a seat is mounted, the chassis having a double-framed structure comprising a primary frame and a secondary frame pivotally attached to each other by a first pivot means so that both the primary frame and the secondary frame are rotatable about a first rotational axis of the first pivot means, two driving wheels being mounted to the primary frame and independently driven by motors, the secondary frame having a front edge frontward extending beyond the primary frame with two front guide wheels mounted thereto, the front guide wheels and the driving wheels being pivotable about the first rotational axis by means of the first pivot means so as to provide surface compliance of the front guide wheels and the driving wheels when moving on an uneven surface; wherein
   a first rotation limiting means is provided between the primary and secondary frames for limiting angular displacement of the secondary frame with respect to the primary frame about the first rotational axis, and the first rotation limiting means comprises a first limiting bolt mounted to the primary frame with a free end thereof spaced from the secondary frame a first distance, whereby when the secondary frame is rotated with respect to the primary frame an angular displacement corresponding to the first distance, the secondary frame contacts the free end of the first limiting bolt, such that further rotation of the secondary frame is prohibited.

2. The wheelchair as claimed in claim 1, wherein the first limiting bolt is rotatable with respect to the primary frame for adjusting the first distance, thereby providing adjustment of the angular displacement through which the secondary frame travels with respect to the primary frame.

3. The wheelchair as claimed in claim 1, wherein the front guide wheels are mounted to a front cross bar which is pivotally attached to the secondary frame by a second pivot means, whereby the front guide wheels and the front cross bar are rotatable with respect to the secondary frame about a second rotational axis of the second pivot means, the second rotational axis being substantially normal to the first rotational axis.

4. The wheelchair as claimed in claim 3, wherein the front guide wheels are rotatably mounted to the front cross bar, each front guide wheel being rotatable about a vertical axis of the front cross bar.

5. The wheelchair as claimed in claim 3 further comprising a second rotation limiting means arranged between the front cross bar and the secondary frame for limiting an angular displacement of the front cross bar about the second rotational axis.

6. The wheelchair as claimed in claim 5, wherein the second rotation limiting means comprises two second limiting bolts mounted on two sides of the second pivot means, each of the second limiting bolts having a free end spaced from the front cross bar a second distance whereby when the front cross bar is moved through the second distance, the front cross bar contacts the corresponding second limiting bolt and further rotation of the front cross bar is prohibited.

7. The wheelchair as claimed in claim 6, wherein the second limiting bolts are rotatable with respect to the secondary frame, thereby providing adjustment of the second distance.

* * * * *